No. 636,674. Patented Nov. 7, 1899.
P. J. KRUGER.
FLUE CUTTER.
(Application filed June 14, 1899.)
(No Model.)

WITNESSES:
Donn Twitchell
C. R. Ferguson

INVENTOR
Philip J. Kruger
BY
Munn
ATTORNEYS

THE NORRIS PETERS CO., PHOTO-LITHO., WASHINGTON, D. C.

UNITED STATES PATENT OFFICE.

PHILIP JACOB KRUGER, OF GREENVILLE, ILLINOIS.

FLUE-CUTTER.

SPECIFICATION forming part of Letters Patent No. 636,674, dated November 7, 1899.

Application filed June 14, 1899. Serial No. 720,499. (No model.)

*To all whom it may concern:*

Be it known that I, PHILIP JACOB KRUGER, of Greenville, in the county of Bond and State of Illinois, have invented a new and Improved Flue-Cutter, of which the following is a full, clear, and exact description.

This invention relates to improvements in devices for cutting out boiler-flues; and the object is to provide a device for this purpose by means of which a flue may be quickly cut at the inner side of the flue-sheet without forming a bur on the flue, thus leaving the flue in perfect condition to have a piece welded on the end, so that it may be used again.

I will describe a flue-cutter embodying my invention and then point out the novel features in the appended claims.

Reference is to be had to the accompanying drawings, forming a part of this specification, in which similar characters of reference indicate corresponding parts in all the figures.

Figure 1:
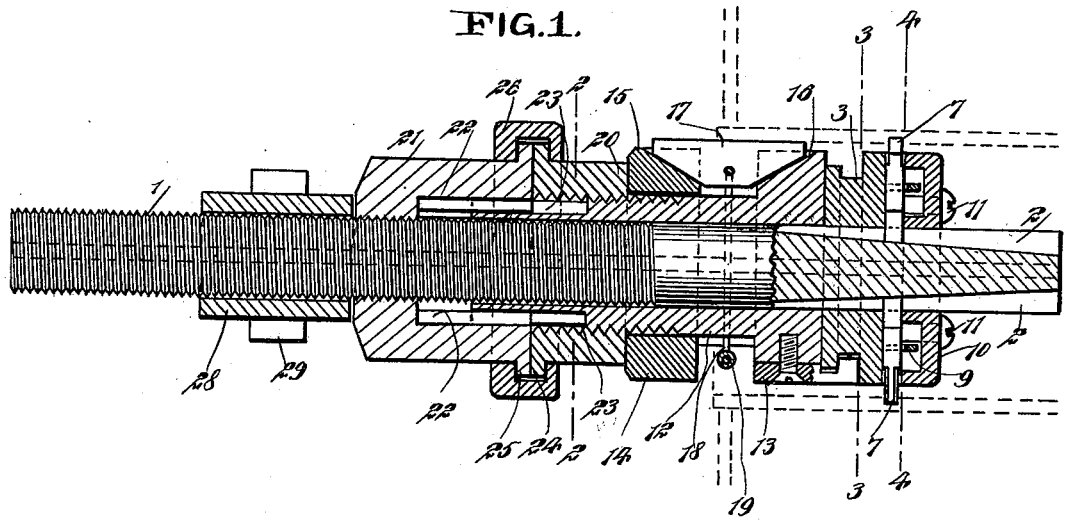
Figure 2:
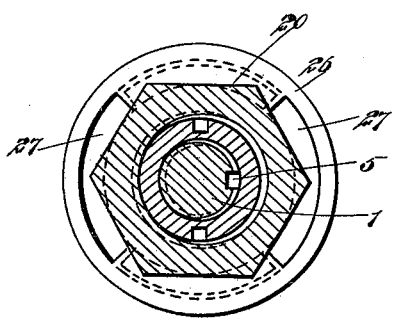
Figure 3:
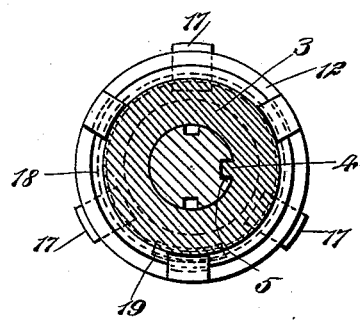
Figure 4:
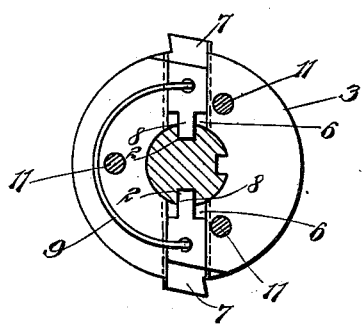

Figure 1 is a longitudinal section of a flue-cutter embodying my invention. Fig. 2 is a section on the line 2 2 of Fig. 1. Fig. 3 is a section on the line 3 3 of Fig. 1, and Fig. 4 is a section on the line 4 4 of Fig. 1.

Referring to the drawings, 1 designates a screw-threaded shaft having at its forward portion opposite channels 2, the inner or base walls of which are longitudinally inclined. Mounted to move longitudinally on the screw-shaft 1, but adapted to rotate therewith, is the cutter-carrying head 3. This cutter-carrying head has a rib 4, adapted to engage in a channel 5, formed longitudinally in the shaft 1 and extended the entire length thereof.

Mounted to move in opposite directions in recesses 6, formed in the front face of the cutter-head, are the cutters 7. These cutters 7 have shank portions 8, which engage in the channels 2, and the cutters are moved toward each other when the shaft 1 is moved in one direction relatively to the cutter-carrying head by means of a spring 9, connected at its ends with the cutters. A cap 10 is removably secured to the front face of the cutter-carrying head by means of screws 11.

A sleeve 12 engages at its forward end with the rear side of the cutter-carrying head 3, and it is held in engagement with said head in such manner that the head may rotate relatively to the sleeve by means of gibs 13, attached to the head portion of the sleeve and having hook ends engaging in an annular channel formed in the cutter-carrying head. An expanding ring 14 is loosely placed on the sleeve 12, and this ring 14 has a series of inclined surfaces 15, opposite inclined surfaces 16, formed on the head of the sleeve 12, and engaging with these inclined surfaces are clamping-blocks 17, which have their inner edges inclined to correspond with the inclines 15 and 16. These blocks 17 are held in place, but permitted to move outward, by means of a spring-ring 18, which passes through openings in the blocks. This ring is open at one side, and the ends may be engaged in a sleeve 19, so as to move freely therein.

Engaging with an exterior screw-thread on the sleeve 12 is a nut 20, designed to force the ring 15 toward the head of the sleeve, and thus force the blocks 17 outward to engage tightly in a flue.

A feeding-nut 21 has its thread engaging with a thread of the shaft 1 and has interior longitudinal ribs 22 for engaging in channels 23, formed in the interior of the sleeve 12. The abutting ends of the nuts 20 and 21 are provided with segmental flanges 24 25, adapted to be engaged by a locking-collar 26. This locking-collar has segmental openings 27, into which pass the segmental flanges 24 and 25 when the collar is to be placed in locking position. After passing the collar over the flanges, as mentioned, it is to be turned to engage its segmental openings with the segmental flanges 24 and 25.

By the rib-and-channel connection between the nut 21 and the sleeve 12 the said nut is prevented from turning when the device is clamped within a tube, so that when the shaft 1 is rotated the device will be fed forward.

To reduce torsional strain of the shaft 1 to a minimum, I removably place upon the shaft a sleeve 28, having an interior rib to engage in the channel 5, and on the exterior of this sleeve are ratchet-teeth 29, with which a suitable instrument may be engaged for turning the shaft. By employing this sleeve 28 the turning strain upon the shaft will be brought nearer to the cutters, and therefore the torsional strain on the shaft will be much less than would be the case were the turning-tool attached to the extreme end of the shaft.

In operation the instrument is to be placed in the flue at a sufficient distance to bring the cutters inward of the flue-sheet, as indicated by the dotted lines in Fig. 1. Then by rotating the nut 20 the ring 15 will be forced forward, causing the blocks 17 to be engaged tightly with the interior of the flue, thus forming a clamp. Then by rotating the shaft 1 to move it inward the inclined walls of the slots 2 will gradually force the cutters outward as they are carried around with the cutter-carrying head. Of course at this time the sleeve 12 and the parts 17, 15, 20, 21, and 26 will remain stationary.

Having thus fully described my invention, I claim as new and desire to secure by Letters Patent—

1. A flue-cutter, comprising a screw-shaft, a cutter-carrying head adapted to be rotated by said shaft but through which the shaft may have longitudinal movement, cutters carried by said head and adapted to be moved outward by the shaft during its movement to rotate the head, and a clamping device mounted on the shaft, substantially as specified.

2. A flue-cutter, comprising a screw-shaft, a cutter-carrying head adapted to be rotated by the shaft but through which the shaft has longitudinal movement, cutters carried by said head and adapted to be forced outward by the longitudinal movement of the shaft, a feeding-nut for the shaft, clamping-blocks, and means for forcing said blocks outward to engage the interior of a flue, substantially as specified.

3. A flue-cutter, comprising a screw-shaft, a cutter-carrying head mounted to rotate with said shaft but through which the shaft has longitudinal movement, cutters carried by said head and adapted to be moved outward by a longitudinal movement of the shaft, a sleeve mounted on the shaft and having a head provided with inclined surfaces, a ring movable on the sleeve and having inclined surfaces, blocks having inclined inner edges to engage with the inclines of said sleeve and ring, a nut engaging with the threaded portion of the sleeve for forcing the ring longitudinally of the sleeve, and a feeding-nut for the shaft and having sliding connection with the sleeve, substantially as specified.

4. A flue-cutter, comprising a screw-shaft, a cutter-carrying head mounted to rotate with said shaft but through which the shaft has longitudinal movement, cutters carried by said head and adapted to be moved outward by a longitudinal movement of the shaft, a spring for moving the cutters inward, a sleeve in which the shaft is mounted to rotate, clamping-blocks supported on the sleeve, a spring-ring passing through said clamping-blocks, a ring on the sleeve for forcing said blocks outward, and a nut engaging with a thread on the sleeve for forcing the ring longitudinally of the sleeve, substantially as specified.

5. A flue-cutter, comprising a screw-shaft having a longitudinal channel and opposite channels at one end, said opposite channels having their inner walls tapered, a cutter-carrying head having ribs extended into the first-named channel, cutters carried by said head and having portions extended into said opposite slots to engage with the inclined walls, a cap removably secured to said head, a sleeve in which the shaft is mounted to rotate, a ring mounted on the sleeve, clamping-blocks adapted to be moved outward by said ring, a nut engaging with the threaded portion of the sleeve for moving the ring on the sleeve, a feeding-nut for the screw-shaft, the adjacent end of said feeding-nut and the first-named nut having segmental flanges, a collar having segmental flanges for engaging with the first-named flanges, and a sleeve removably engaging with the shaft but mounted to rotate therewith and having ratchet-teeth on its outer side, substantially as specified.

PHILIP JACOB KRUGER.

Witnesses:
WARD REID,
J. M. APPEL.